C. W. SADLER.
IRONING MACHINE.
APPLICATION FILED MAY 26, 1913.

1,110,828.

Patented Sept. 15, 1914.
5 SHEETS—SHEET 2.

WITNESSES

INVENTOR
Charles W. Sadler
BY
ATTORNEYS

UNITED STATES PATENT OFFICE.

CHARLES WILLIAM SADLER, OF WINDSOR LOCKS, CONNECTICUT.

IRONING-MACHINE.

1,110,828.   Specification of Letters Patent.   Patented Sept. 15, 1914.

Application filed May 26, 1913. Serial No. 769,874.

*To all whom it may concern:*

Be it known that I, CHARLES WILLIAM SADLER, a citizen of the United States, and a resident of Windsor Locks, in the county of Hartford and State of Connecticut, have invented a new and Improved Ironing-Machine, of which the following is a full, clear, and exact description.

This invention relates to improvements in mangles or ironing machines, and has for an object to provide a machine in which a number of small cylinders are used and means associated therewith for causing the opposite sides of the matter being ironed to engage some of the cylinders, while still in a moist condition.

A further object of the invention is to produce a machine designed to occupy a minimum space and present a maximum contact surface for the matter being ironed and at the same time use a low steam pressure.

A still further object of the invention is to provide an ironing machine with an improved form of trap for preventing steam from passing into the drip pipes by reason of a column of water arranged in the traps.

In carrying out the objects of the invention a number of comparatively small steam rollers are provided, together with means for shifting or moving an article from one roller to the other and presenting opposite sides of the article to the successive rollers, whereby the article is ironed or pressed on opposite sides while still moist, and is gradually dried as the same passes through the machine. These cylinders or rollers are geared so as to operate together and preferably at a high rate of speed within the apron or belt carrying the article to be dried, so that a rubbing action will be presented. By reason of the small cubic area of the rollers or cylinders, a maximum contact surface is presented within a minimum area, and by providing a plurality of these cylinders comparatively low pressure steam may be used, which in turn is prevented from escaping by an improved form of trap arranged adjacent each of the cylinders. These traps are all connected together so as to drain from a single drain pipe and thus properly and continually dispose of the condensed steam. Associated with the two cylinders at the lower part of the machine are pressure rollers which may be caused to press the article being ironed with any degree of pressure. These pressure rollers act only on the two lower rollers and consequently act only on the goods being ironed while in a moist or wet condition.

A practical embodiment of the invention is represented in the accompanying drawings forming a part of this specification, in which similar characters of reference indicate corresponding parts in all the views.

Figure 1:
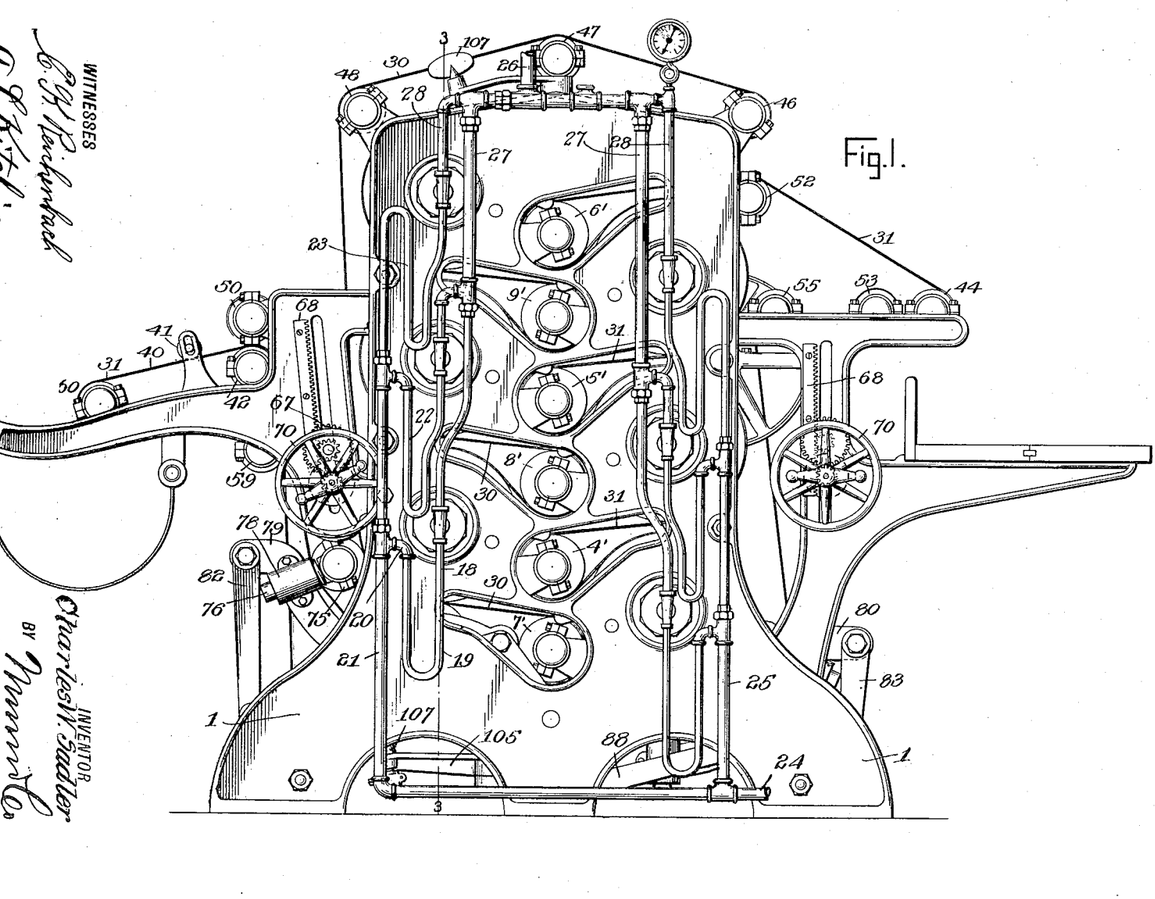
Figure 1 is a side elevation of an embodiment of the invention.
Figure 2:
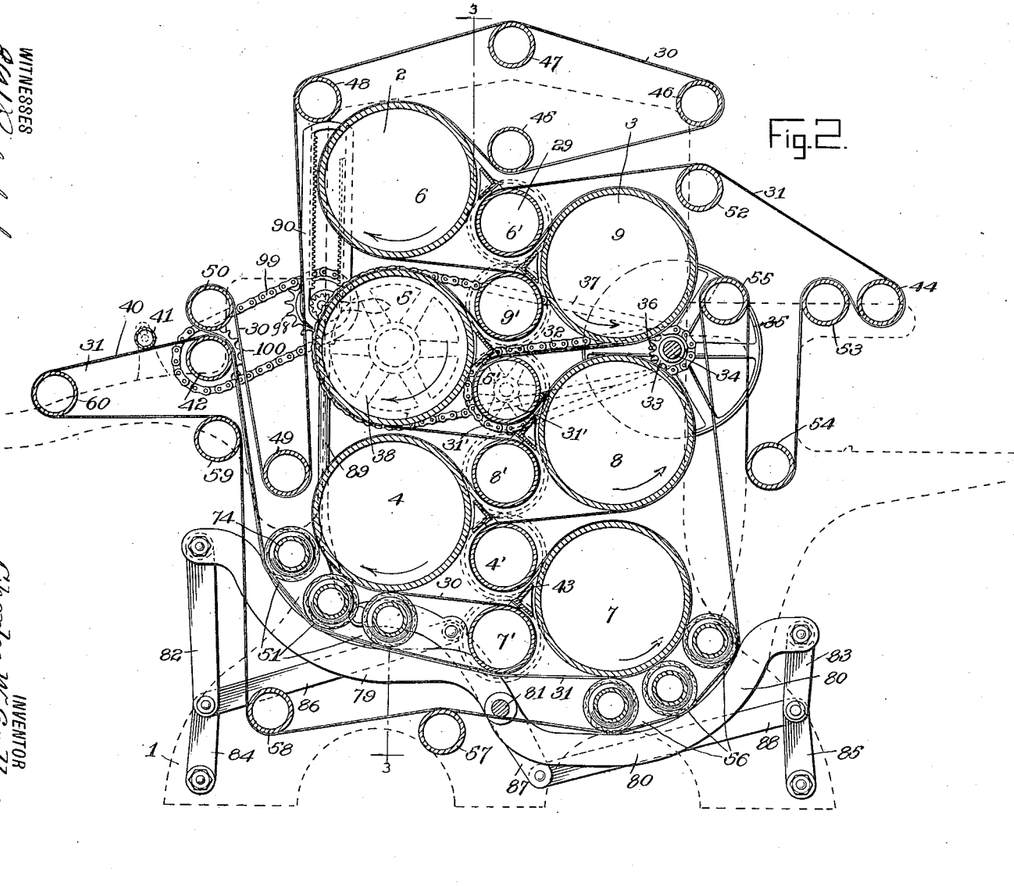
Fig. 2 is a longitudinal vertical section through the structure shown in Fig. 1.
Figure 6:
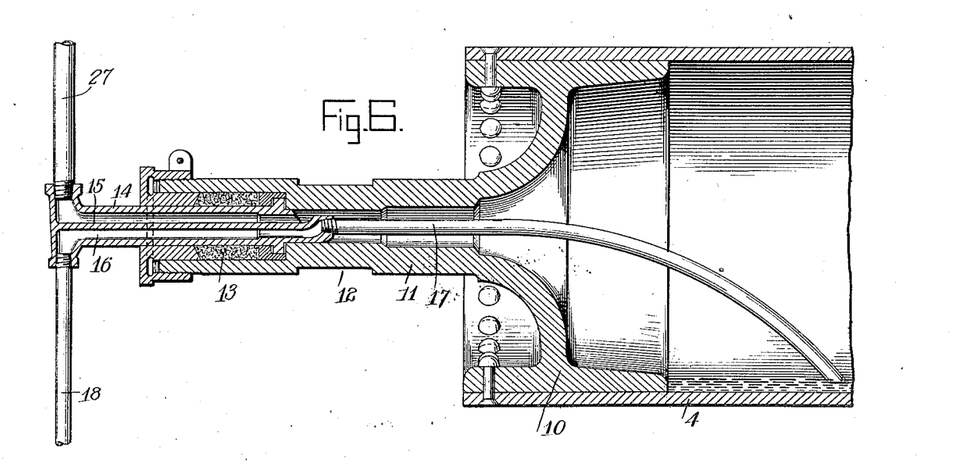
Fig. 6 is an enlarged fragmentary sectional view through one of the ironing cylinders.

Referring to the accompanying drawings by numerals, 1 indicates a framework of any desired kind, formed with openings and bearing boxes for receiving the various journals of the steam cylinders, rollers, gear wheels, and certain shafts. Arranged on frame 1 are rows of cylinders 2 and 3, row 2 containing cylinders 4, 5, and 6, and row 3 containing cylinders 7, 8, and 9. All of these cylinders are similar in construction but preferably offset, as shown in Fig. 2, so that the center of cylinder 4 will be approximately opposite the space between cylinders 7 and 8, and the cylinders 5 and 6 correspondingly arranged. The detail structure of these cylinders is shown in Fig. 6. Referring to this figure, it will be observed that the cylinder is provided with a tubular portion having an end member 10 riveted or otherwise rigidly secured in place, but the opposite end of the cylinder may be closed by any desired means. End member 10 is provided with a projecting tubular member 11 which is provided with a journal portion 12 and with a packing box 13 designed to provide a tight joint for the tubular member 14. The tubular member 14 has passageways 15 and 16 arranged therein, passageway 16 having connected therewith a discharge pipe 17. The discharge pipe 17 is bowed or bent at its inner end so that the inner end will be positioned adjacent the bottom part or lowest point of the roller, and thereby provide means for causing the discharge of condensed steam through passageway 16 into pipe 18. Steam is intended to pass through pipe 19 into passageway 15 and from thence into the cylinder 4 where it is condensed and passes out in the form of water through pipe 18. As shown in Fig. 1, pipe 18 extends downwardly and forms a trap 19 having a connection 20 which opens into a common return 21. Each of the traps 19, 22, and 23 open into the common return 21 so that water may be finally directed out a discharge pipe 24. The cylinders 7, 8, and 9 are also provided with traps and a common return 25 in a similar manner to cylinders 4, 5, and 6, so that the same will need no additional description. Pipe 25, as clearly shown in Fig. 1, discharges into the discharge pipe 24 so that there will only be one discharge pipe leading from the machine. Also it will be noted that pipe 26 (at top of the machine in Fig. 1) is used for supplying steam through pipes 27 and 28 to their respective cylinders. In this way there is only one inlet pipe for all of the cylinders and one discharge pipe, and all of the cylinders are maintained heated to the desired degree with a comparatively low steam pressure. It will also be noted that the water in the various steam cylinders is maintained at a low level and that the steam cannot escape by reason of the back pressure of the water in the traps. This is very desirable as there will be no waste steam and a maximum surface will be heated with a minimum amount of steam and with comparatively low pressure. In connection with the use of comparatively small steam cylinders it is desired to point out that not only low steam pressure may be used in connection with small cylinders, but a larger heating surface will be presented than if a single or only a pair of large cylinders were used. It also allows the goods being ironed to be ironed upon opposite sides while still moist.

Figure 3:
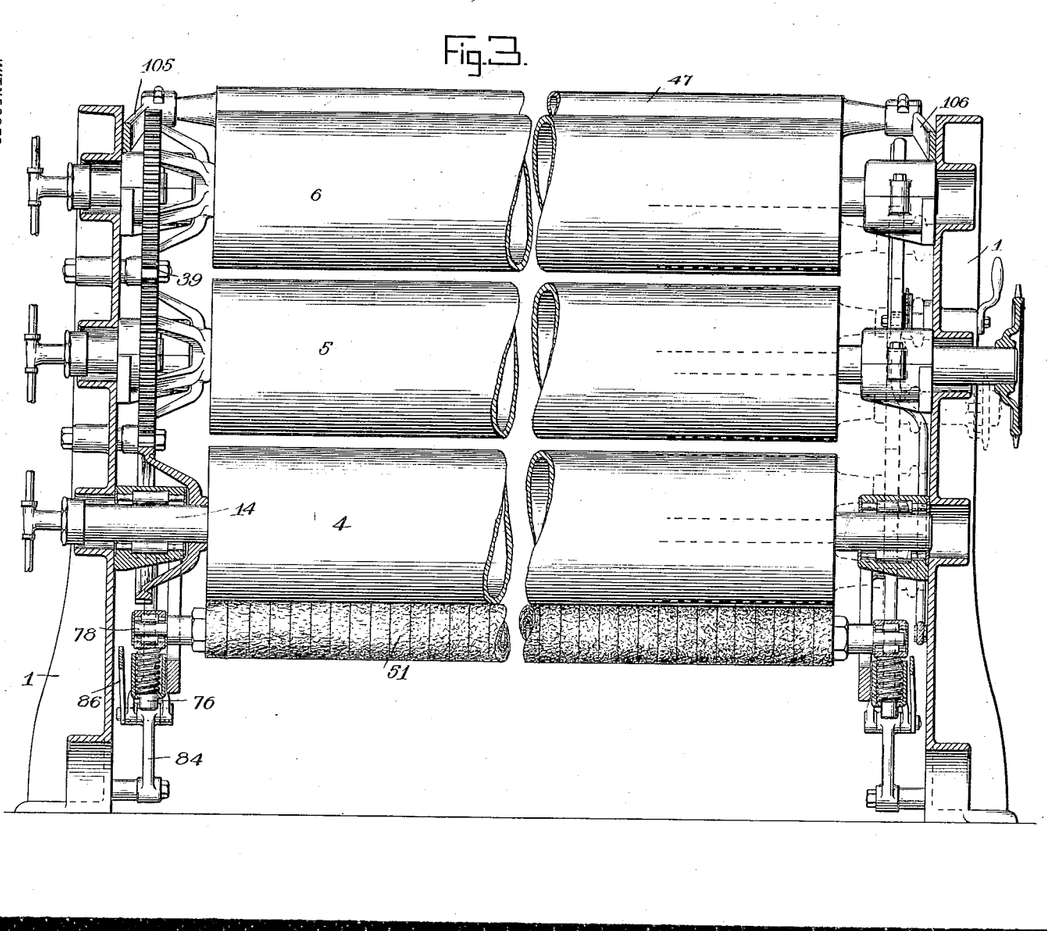
Fig. 3 is a sectional view through Fig. 1 on the line 3—3, certain parts being removed.

Arranged between the series of cylinders 2 and 3 is a row of tubular rollers 29 which may be termed transfer rollers and which are intended to drive the belts or aprons 30 and 31. These rollers are all intergeared so that each adjacent roller will rotate in an opposite direction and are driven through the use of a sprocket wheel 31' connected with one of the rollers. The sprocket wheel 31' accommodates a chain 32 passing over a sprocket wheel 33 rigidly connected with shaft 34. The shaft 34 has connected therewith a power wheel 35 designed to be operated by a belt or any other preferred form of power. On the shaft 34 is also arranged a second sprocket 36 which accommodates a chain 37 passing around a sprocket wheel 38 rigidly connected with cylinder 5. The cylinders 4, 5, and 6 are connected together by suitable idlers 39 (Fig. 3) so that they will all rotate in the same direction as indicated by the arrows in Fig. 2. The cylinders 7, 8, and 9 are similarly geared together and rotate in an opposite direction to cylinders 4, 5, and 6. The cylinders 7, 8 and 9 may be driven by chain or sprocket mechanism connected with shaft 34, or may be connected with one of the driving gears of cylinders 4, 5, and 6 through a suitable train of gearing or an idler. In arranging the driving means for the cylinders and for the tubular rollers 29, the cylinders are preferably rotated so that their periphery will travel slightly faster than the aprons 30 and 31. This will give a rubbing effect to the goods being ironed.

Figure 9:
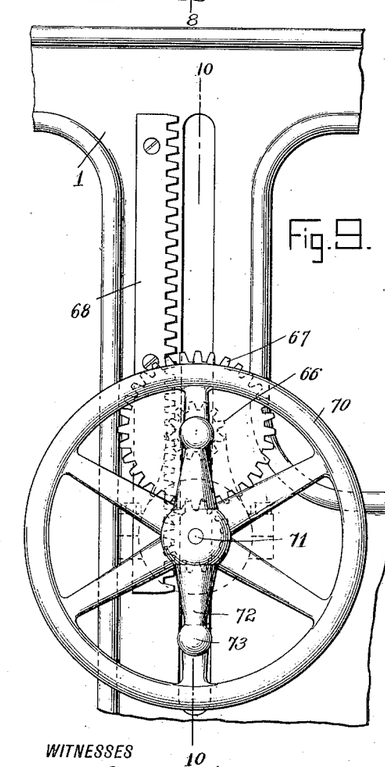
Fig. 9 is a side view of the elevating means for the weighted roller, the same being shown on an enlarged scale.
Figure 10:
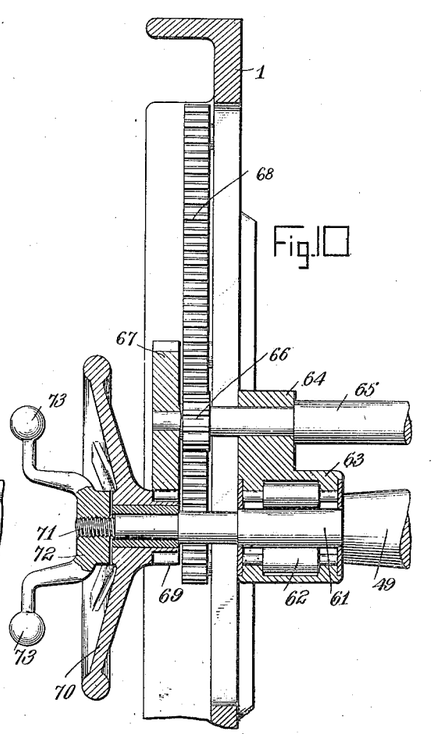
Fig. 10 is a section through Fig. 9 on the line 10—10.

When it is desired to iron a piece of goods the same is placed on apron 31 at point 40 and apron 31 moves the same beneath the guarding roller 41 and over a guide roller 42. As soon as the article moves over guide roller 42 the same is engaged by the apron 30, and from then on is held between aprons 30 and 31 until apron 30 passes over roller 7'. The article continues to move with apron 31 until it is engaged and ironed on one side by cylinder 7. After having passed around cylinder 7, the article is scraped off of cylinder 7 by a flexible knife 43 and is deposited upon apron 30 which carries it around cylinder 4. It will be observed that cylinder 7 engages the article on one side and cylinder 4 upon the opposite side. In actual operation these two cylinders are not sufficiently heated to entirely dry the article so that the same is pressed while in a moist condition, and the remaining cylinders thoroughly dry the article before the same is discharged out of the machine. From cylinder 4 the article passes successively around cylinders 8, 5, 9 and 6. From cylinder 6 the article is discharged upon apron 31 which causes the article to be discharged out of the machine over a guiding roller 44. A thin flexible knife 43 is arranged opposite each of the cylinders so as to insure the removal of the article therefrom. These knives are firmly fixed to a suitable cross bar so as to continually resiliently press against the cylinders. Preferably the blades are in contact with the cylinders and thereby automatically adjust themselves to the inequalities which may be raised on the cylinders. It will be observed that apron 30 passes over the tubular rollers 7', 8', and 9', while apron 31 passes over rollers 4', 5' and 6'. The apron 30 extends from cylinder 6 over a tubular roller 45 which is an idler, and from thence over idlers 46, 47, 48, weighted roller 49, idler 50, and from thence over roller 7', after having passed over the pressure rollers 51. This apron, as clearly shown in Fig. 2, is endless and continually moves in the path described during the operation of the machine. Apron 31 passes from rollers 6' over idlers 52, 44, 53, weighted roller 54, idler 55, and from thence over the pressure rollers 56 idler 57 and over idlers 57, 58, 59, 60, 42, pressure rollers 51 to cylinder 7, and from thence over various rollers and cylinders heretofore described. The weighted rollers 49 and 54 arranged on opposite sides of the machine are designed to maintain the aprons properly stretched or in a taut condition so as to act in a proper manner and to propel the article being ironed, as described. In connection with the rollers 49 and 54, a detail showing is provided in Figs. 9 and 10, which indicates how these rollers may be positively actuated for releasing the apron under certain conditions in order that the pressure rollers 51 and 56 may be released to drop downwardly, as hereinafter fully described. As the rollers 49 and 54 are similar, a description of roller 49 will equally apply to roller 54. The roller 49 is provided with a bearing extension 61 designed to engage suitable antifriction rollers 62 arranged in the box or housing 63. The box or housing 63 is provided with a projection 64 in which a connecting shaft 65 is arranged. It will be, of course, evident that there is a box similar to the box 63 at the opposite end of rollers 49 and 54 for properly supporting these rollers. Shaft 65 carries at its outer end a comparatively small pinion 66, and also a gear wheel 67 considerably larger than pinion 66. The pinion 66 is adapted to continually mesh in a stationary rack 68 rigidly connected with the frame 1, while gear wheel 67 continually meshes with the pinion 69, preferably formed integral with a hand wheel 70, though the same may be made separately and rigidly secured thereto, if desired. By this construction and arrangement whenever the handle 70 is rotated in one direction the box 63 will be elevated, and when rotated in an opposite direction the same will be lowered so as to tighten or loosen the apron. Shaft 61 extends through wheel 70 so that wheel 70 is loosely mounted thereon. The end of shaft 61 is provided with a threaded portion 71 designed to receive a hand operated nut member 72 formed with a handle 73. Whenever the handles 73 are rotated so as to tighten the nut member 72 against wheel 70, wheel 70 and roller 49 will be connected so that a movement conveyed by the apron to roller 49 will cause a rotary movement of wheel 70 and associated parts. If the roller 49 is moved in one direction the apron will be loosened, and if moved in an opposite direction the same will be tightened, the design being to cause the apron to automatically raise the roller 49 and thereby loosen the belt. This is very desirable where the pressure rollers 51 and 56 are being lowered. Under ordinary circumstances, however, the weight of the roller 49 rests directly upon the apron, and also the weight of the box 63 and associated parts is supported by the apron and thereby the apron is maintained taut. The shaft 65 is arranged to extend entirely across the machine and operate a pinion similar to pinion 66, meshing with a similar rack to a rack 68 so that the roller 49 will be bodily raised and lowered.

In connection with the pressure rollers 51 and 56, it is the intention to make these rollers of resilient or yielding material. These rollers are preferably built up of washers made of felt or cork, or both, with metallic washers arranged between each of the felt or cork washers, the metallic washers being smaller than the felt or cork washers so that when the nut or other tightening means at the end of the roller is properly tightened, the felt or cork washers are squeezed together so that the entire roller is properly held so as to act together and also against the rod or roller on which it is placed. The rollers formed in this manner remain springy so as to provide a proper pressure against the goods being ironed. The opposite ends of each of the tubular supports 74 for the rollers 51 and 56 are mounted in suitable bearings 75 (Fig. 1) which is provided with a depending shaft 76 extending through a suitable sleeve 78. The sleeve 78 carries a spring acting against the bearing so as to resiliently support the bearing. Any number of these rollers may be arranged to act upon the cylinders 4 and 7, three being preferably provided for each cylinder. The rollers 51 are mounted upon a pivotally mounted arm 79, while rollers 56 are mounted upon a pivotally mounted arm 80. The arms 79 and 80 are pivotally connected at one end with the supporting rod or shaft 81 and at the opposite end having pivotally connected therewith links 82 and 83 respectively. Pivotally connected with links 82 and 83 are secondary links 84 and 85. The pivotal connection which holds links 82 and 84 together also pivotally supports a connecting bar 86 which is pivotally connected to a lever 87 mounted on shaft 81. In a similar manner the pivotal connection between links 82 and 85 supports a bar 88 which is pivotally connected with lever 87. The connection of bars 86 and 88 with lever 87 are at such a distance from shaft 81 that by their particular connection with the links 82 to 85 inclusive they are adapted to control the action of the links 82 to 85 inclusive, this action being on the order of toggle joints. The lever 87 extends beyond bar 86 and has pivotally connected therewith a depending rod 89, which in turn is rigidly secured with a frame 90 (Figs. 2, 7, and 8).

Figure 7:
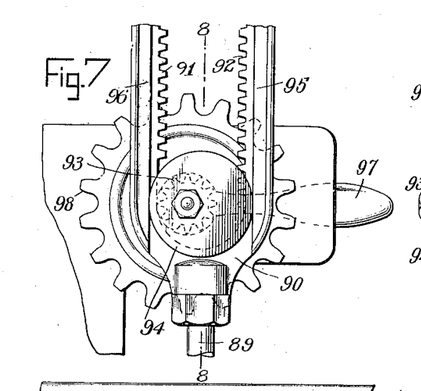
Fig. 7 is an enlarged fragmentary side view of the pressure roller shifting mechanism.
Figure 8:
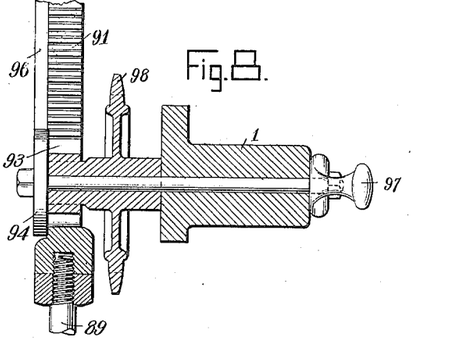
Fig. 8 is a section through Fig. 7 approximately on the line 8—8.

The frame 90 shown in detail in Figs. 7 and 8 is provided with facing racks 91 and 92, the rack 91 falling short of the bottom of the frame but extending to the top, while rack 92 extends to the bottom of the frame and falls short of the top. A pinion 93 is arranged in frame 90 and designed to engage the racks 91 and 92 respectively, according to the position of the cam 94 which rests against the guideways 95 and 96. Rigidly connected with the eccentric 94 is a handle 97 which is used in turning the eccentric so that pinion 93 may engage the rack 92. The shaft carrying the pinion 93 is continually rotated by sprocket wheel 98 which receives power through chain 99 from a sprocket wheel 100 connected with roller 42. The roller 42 may receive power from any desired source. When pinion 93 is in engagement with rack 92, frame 90 will be forced downwardly, together with rod 89 and parts associated therewith. A downward movement of rod 89 will cause lever 87 to move pivotally so as to cause rods 86 and 88 (Fig. 2) to move substantially longitudinally. This will cause the links 82 to 85 inclusive to move and produce a downward swinging movement of the arms 79 and 80. As the rollers 51 and 56 are connected with arms 79 and 80, the same will be moved downwardly or away from cylinders 4 and 7, so as to allow thicker material to be ironed or for an inspection of the rollers, as desired. This downward movement of the rollers 51 and 56 will not in any way displace or derange the apron or any of the moving parts. When it is desired to cause the rollers to move upwardly to the position shown in Fig. 2, the handle 97 is moved over to the position shown in Figs. 2 and 7, and the pinion 93 will mesh with rack 91. As pinion 93 is continually moving the same will elevate frame 90, together with rod 89 and parts connected therewith. As soon as frame 90 has moved to the position shown in Fig. 7, no further upward movement will be made as the pinion will become disengaged from rack 91.

Figures 4, 5:
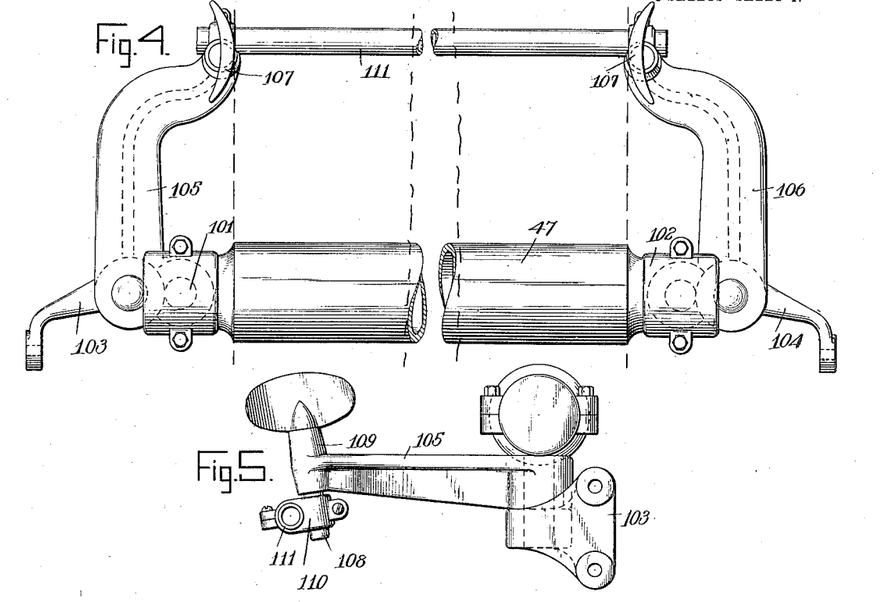
Fig. 4 is an enlarged top plan view of the apron guiding mechanism at the top of the machine.
Fig. 5 is an edge view of the structure shown in Fig. 4.

In connection with the apron 30, means are provided at the upper part of the machine for guiding the apron and for correctly centering the same. These means being shown in detail in Figs. 4 and 5. As clearly shown in these figures the roller or idler 47 is mounted in suitable supporting bearings 101 and 102, carried upon the arms 105 and 106, which in turn are pivotally mounted on brackets 103 and 104 secured to the frame 1 by any desired means, as for instance by bolts. The arms 105 and 106 which carry the guiding friction members 107 have depending journal members 108 loosely fitting in the sleeves 109. The clamps 110 are connected with the journal members 108 for holding the same in place and in order to prevent a rotary or turning movement of the members 108, a cross bar 111 is rigidly clamped in the members 110.

Having thus described my invention I claim as new and desire to secure by Letters Patent:—

1. In an ironing machine of the class described, a frame, a plurality of series of ironing cylinders, the cylinders of one series rotating in an opposite direction to the cylinders of the other series, means for heating said cylinders, a pressure roller for the lowermost cylinder in each series, an independent apron for each series of cylinders for guiding material to be ironed around said cylinders, a series of transfer rollers for guiding said aprons, and means for transferring said material to be ironed from one series of cylinders to the other, said means and the position of said apron causing said material to be engaged by one of said cylinders on one side and then on the opposite side by the next cylinder and so on through the machine, whereby the material to be ironed alternately engages cylinders of said series and is ironed on opposite sides.

2. In an ironing machine of the class described, a plurality of series of ironing cylinders, said series being arranged parallel, an independent apron for each of said series, independent driving means for each of said aprons, driving means for said cylinders, and means for causing the article being ironed to be transferred from the first cylinder of one series to the first cylinder of the second series and from thence to the second cylinder of the first series, and so on through the entire machine whereby the article being ironed is engaged on opposite sides by certain of the cylinders.

3. In an ironing machine of the class described, a plurality of ironing cylinders, feeding and guiding aprons passing around said cylinders, said aprons feeding article to be ironed to said cylinders, and from one cylinder to the other, means for driving said aprons, and means for driving the cylinders at a higher rate of speed than said aprons whereby the articles being ironed will be polished.

4. In an ironing machine of the class described, a pair of rows of ironing cylinders, a single row of driving rollers, there being one roller for each cylinder, an apron for each row of cylinders, said aprons passing over each alternate driving roller, and a knife arranged adjacent each of said cylinders for causing an article passing thereover to be transferred to the apron passing over one of said driving rollers whereby the article may be carried to the next cylinder in the adjacent row.

5. In an ironing machine of the class described, a plurality of ironing cylinders, a plurality of pressure rollers for cylinders, a substantially arc-shaped arm arranged adjacent each of said cylinders for supporting said pressure rollers, resilient means for connecting said pressure rollers with said arms, a toggle connected with the outer end of each of said arms, a link connected with each of said toggles for operating the same, whereby said arms are raised and lowered for allowing various thicknesses of material to be passed between the pressure rollers and the cylinders, means for simultaneously operating said rollers, and a continuously moving member for moving said means and holding the same in one of its extreme positions whereby said pressure rollers are held against said cylinders or out of contact therewith.

6. In an ironing machine of the class described, a plurality of ironing cylinders, a plurality of pressure rollers arranged adjacent each of said cylinders, a pivotally mounted arm arranged adjacent each of said cylinders and carrying said rollers, toggle members connected to said arms for supporting and actuating the same, a bar connected with each of said toggle members, a pivotally mounted lever, means for connecting said bars with said pivotally mounted lever, means for actuating said pivotally mounted lever for causing said toggles to be operated and said arms together with their rollers to be lowered and raised, a feeding and guiding apron for each of said cylinders, said feeding and guiding aprons directing articles to be ironed to said cylinders and between said pressure rollers and cylinders, means for driving said apron, and means for driving said cylinders.

7. In an ironing machine of the class described, a plurality of ironing cylinders, pressure rollers arranged adjacent each of said cylinders, means for moving said pressure rollers toward and from said cylinders, means for actuating said last mentioned means, said actuating means comprising a rod, a rack secured to said rod, a continuously rotating pinion, and means for throwing said pinion into engagement with said rack, means for feeding material to be ironed between said pressure rollers and said cylinders, and means for driving said cylinders.

8. In an ironing machine of the class described, an ironing cylinder, a pressure roller arranged adjacent said cylinder, an arm for supporting said pressure roller, actuating means for moving said arm toward and from said cylinder, a frame pivotally connected with said actuating means, said frame being provided with a pair of facing racks, said racks overlapping each other at opposite ends, a pinion arranged between said racks, a runway arranged on said frame, an eccentric engaging said runway and connected with said pinion, means for actuating said eccentric for moving said pinion from one side of said frame to the other so as to engage either of said racks, means for continuously actuating said pinion in one direction whereby when said pinion is in engagement with one of said racks said pressure roller will be raised, and when in engagement with the other rack said pressure roller will be lowered, means for feeding articles between said cylinder and said pressure roller, and means for driving said cylinder.

9. In an ironing machine of the class described, a plurality of ironing cylinders, a steam supply pipe, means for connecting said steam supply pipe to said cylinders whereby live steam may be forced through said cylinders, a discharge pipe, and means for connecting said cylinders with said discharge pipe, said means including a trap for each of said cylinders formed with a sufficiently deep bend as to provide a head of water whereby the live steam from said cylinders cannot pass into said discharge pipe, means for guiding material to be ironed to said cylinders, and means for driving said cylinders.

10. In an ironing machine of the class described, a plurality of ironing cylinders, an apron for said cylinders, for directing the material to be ironed to the cylinders, means for rotating said cylinders, means for driving said apron, and means for maintaining a proper tension on said apron, said means including a weighted roller, a pinion, manually operated means for rigidly connecting said pinion with said roller, a gear wheel meshing with said pinion, a second pinion rigidly connected with said gear wheel, and a rack continually in mesh with said second mentioned pinion whereby when said manually operated means is actuated for connecting said first mentioned pinion with said weighted roller, the weighted roller will be automatically raised for reducing the tension on said apron.

11. In an ironing machine of the class described, a plurality of ironing cylinders, pressure rollers arranged adjacent each of said cylinders, means for moving said pressure rollers toward and from said cylinders, means for actuating said means, said last mentioned means comprising a substantially reciprocating rod, a frame secured to said rod provided with a pair of facing racks, a continuously rotating pinion, and means for throwing said pinion into engagement with either of said racks, whereby said reciprocating rod is moved in one direction or the other, means for feeding material to be ironed between said pressure rollers and said cylinders, and means for rotating said cylinders.

12. In an ironing machine of the class described, a plurality of ironing cylinders, means for supplying steam to each of said cylinders, means for drawing water from said cylinders, means including a trapping system for the water drawn from said cylinders, said trapping system comprising a single drainage pipe and a plurality of traps, one trap being associated with each of said cylinders, each of said traps being of a depth sufficient to maintain a water head of such depth as to resist the pressure of steam in said cylinder, means for feeding articles designed to be ironed to said cylinders, and means for rotating said cylinders.

In testimony whereof I have signed my name to this specification in the presence of two subscribing witnesses.

CHARLES WILLIAM SADLER.

Witnesses:
   SAMUEL SOWTER,
   WILLIAM SMITH ADAMS.